United States Patent [19]

Metroka et al.

[11] Patent Number: 5,036,532
[45] Date of Patent: Jul. 30, 1991

[54] PORTABLE TELEPHONE WITH POWER SOURCE/MODE CHANGE DURING CALLS

[75] Inventors: Michael P. Metroka, Algonquin; Thomas J. Walczak, Woodstock; Robert K. Krolopp, Hoffman Estates, all of Ill.

[73] Assignee: Motorola, Inc., Schaumburg, Ill.

[21] Appl. No.: 634,784

[22] Filed: Dec. 27, 1990

Related U.S. Application Data

[63] Continuation of Ser. No. 389,084, Aug. 3, 1989, abandoned.

[51] Int. Cl.⁵ .................. H04M 11/00; H04B 7/00
[52] U.S. Cl. .................. 379/58; 455/127; 455/89
[58] Field of Search .................. 455/343, 89, 127, 38, 455/68, 90; 379/58, 61, 62, 63

[56] References Cited

U.S. PATENT DOCUMENTS

| | | | |
|---|---|---|---|
| 4,627,107 | 12/1986 | Hohlfeld et al. | 435/89 |
| 4,680,787 | 7/1987 | Marry | 379/58 |
| 4,684,870 | 8/1987 | George et al. | 320/20 |
| 4,852,147 | 7/1989 | Suzuki et al. | 379/58 |

FOREIGN PATENT DOCUMENTS 0283235 11/1988 Japan .................. 455/127

Primary Examiner—Reinhard J. Eisenzopf
Assistant Examiner—Kinfe-Michael Negash
Attorney, Agent, or Firm—Rolland R. Hackbart

[57] ABSTRACT

A unique cellular portable telephone (100) automatically accommodates a power source change during a cellular telephone call between the portable's battery (300) and another battery or an external power source from vehicular adaptor (200), such as, for example, a battery eliminator adaptor, a hands-free adaptor, or a mobile transceiver adaptor. The operating mode of portable telephone (100) also automatically changes when it is coupled to or decoupled from vehicular adaptor (200) during a cellular telephone call. For example, when vehicular adaptor (200) is plugged into portable telephone (100), the portable display (116) is not disabled when inactive for a predetermined time.

12 Claims, 4 Drawing Sheets

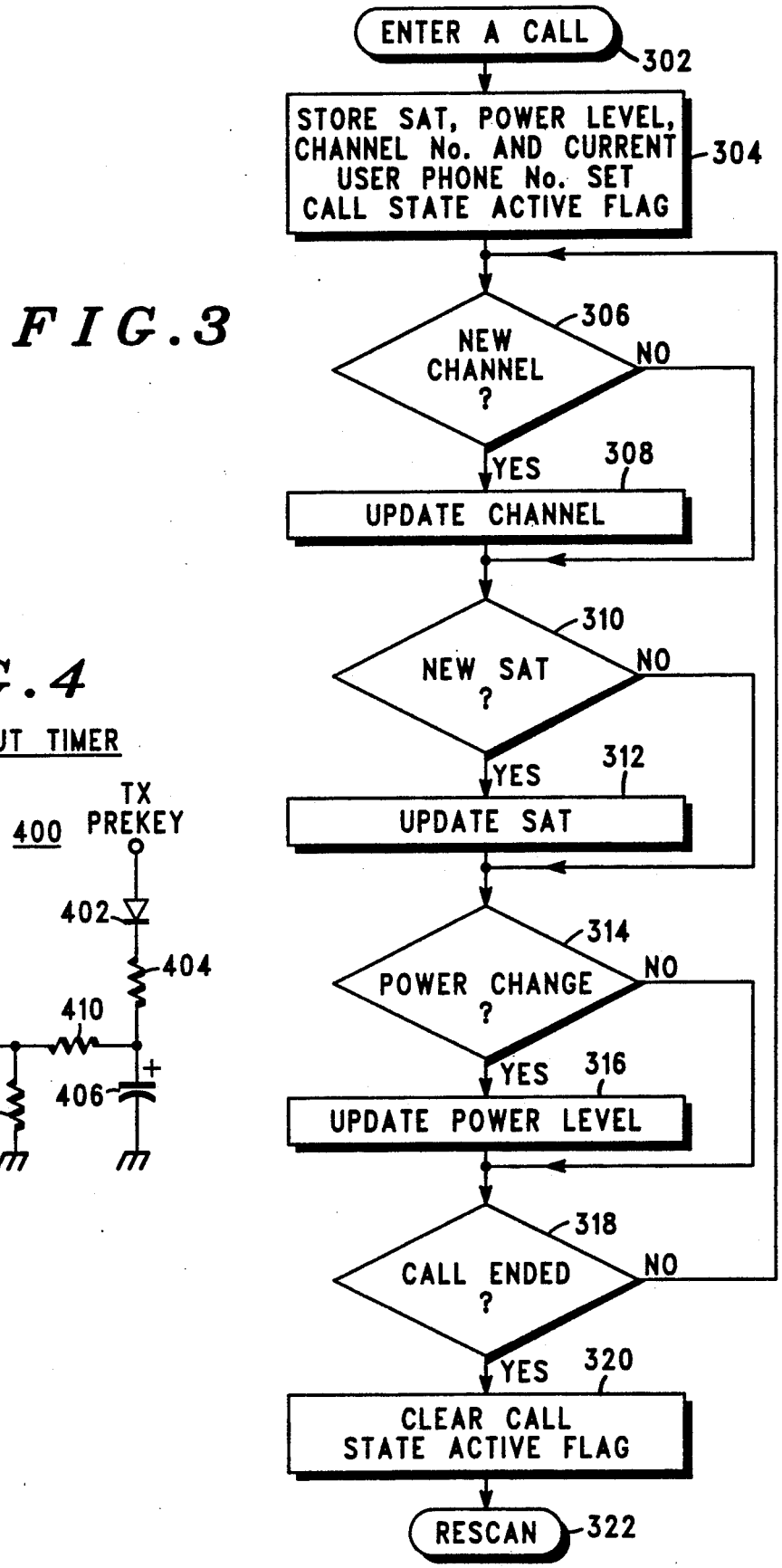

PORTABLE TELEPHONE WITH POWER SOURCE/MODE CHANGE DURING CALLS

This is a continuation of application Ser. No. 07/389,084, filed Aug. 3, 1989 and now abandoned.

BACKGROUND OF THE INVENTION

The present invention is generally related to radiotelephones, and more particularly to a cellular portable telephone which accommodates a power source change and corresponding operating mode change during a radiotelephone call.

Cellular portable telephones currently have batteries with capacity for one-half hour of continuous operation. As a result most users typically carry one or more spare batteries so that they can switch to another battery when the portable telephone indicates that the battery voltage is low. However, when the battery is removed during a cellular telephone call, the call is terminated and the user must redial the call. Interruption of the power source and termination of a cellular telephone call in process also occurs when the user plugs the cellular portable telephone into a vehicle's battery by way of a vehicular adaptor installed therein, such as a battery eliminator connected to the vehicle's cigarette lighter. For the foregoing reasons, there is a need for a cellular portable telephone which accommodates a power source change and corresponding operating mode change during a cellular telephone call.

OBJECTS OF THE INVENTION

Accordingly, it is an object of the present invention to provide a unique portable radiotelephone, which automatically accommodates a power source change and corresponding operating mode change during a radiotelephone call.

It is another object of the present invention to provide a unique portable radiotelephone, which automatically determines the type of power source coupled thereto and changes the operating mode of the portable radiotelephone to correspond thereto.

BRIEF DESCRIPTION OF THE DRAWINGS

FIG. 3 is a flow chart for the process used by microcomputer 104 in FIG. 1 for storing and updating specific cellular information during a cellular telephone call.

FIG. 4 is a circuit diagram of timer 400 in cellular portable telephone 100 in FIG. 1.

DETAILED DESCRIPTION OF THE PREFERRED EMBODIMENT

Figure 1:
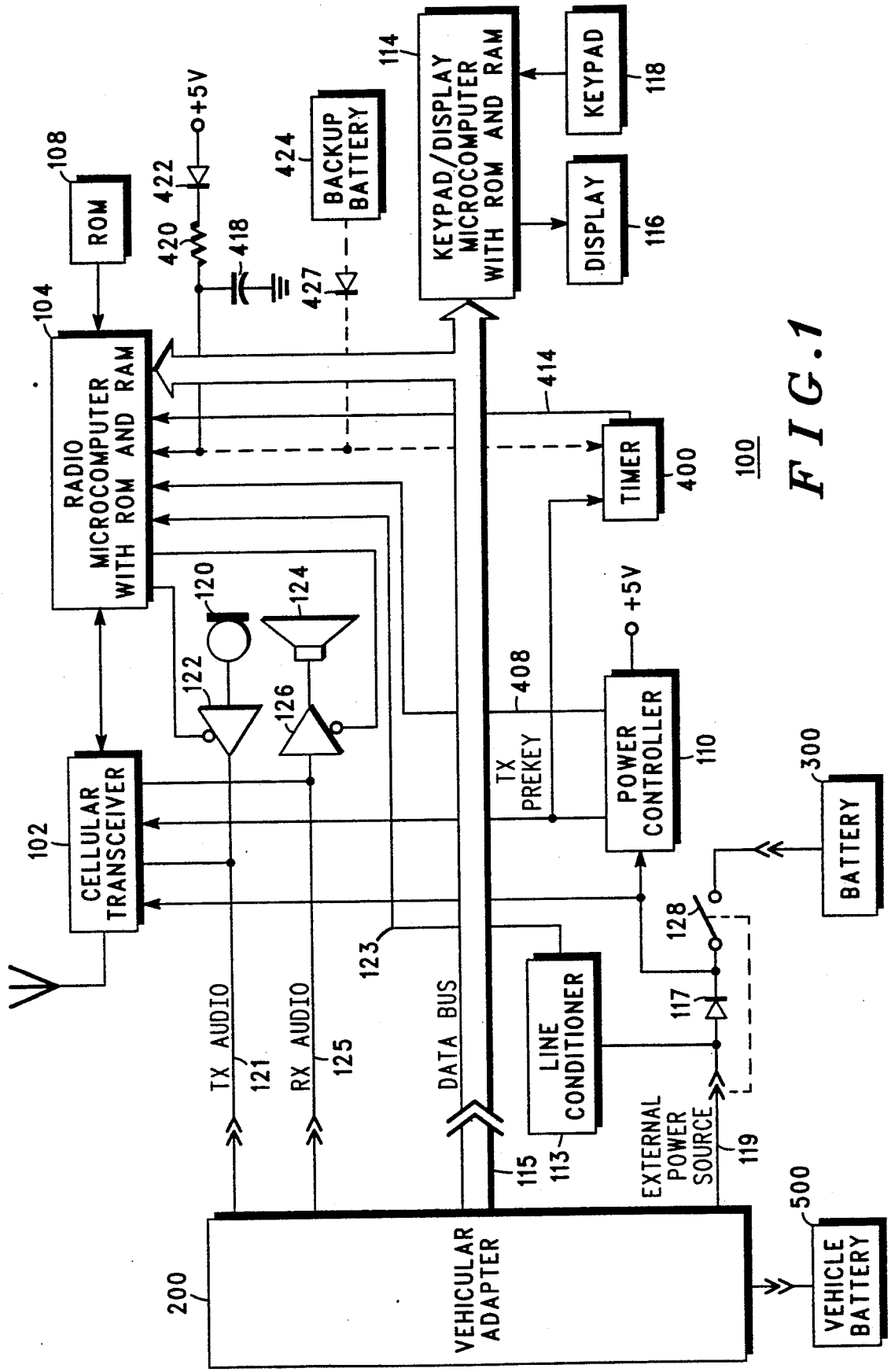
FIG. 1 is a block diagram of a cellular portable telephone 100 embodying the present invention.

Referring to FIG. 1, there is illustrated a block diagram of a cellular portable telephone 100 embodying the present invention, which automatically accommodates a power source change during a cellular telephone call between the portable's battery 300 and another battery or an external power source from vehicular adaptor 200, such as, for example, a battery eliminator adaptor, a hands-free adaptor, or a mobile transceiver adaptor. In other embodiments, vehicular adaptor 200 may be a voltage source coupled to conventional AC line power. Portable telephone 100 includes cellular radiotelephone transceiver 102 operable in cellular radiotelephone systems, microphone 120 and switchable amplifier 122, speaker 124 and switchable amplifier 126, radio microcomputer 104 with internal RAM storing pertinent cellular telephone call parameters and ROM 108 storing control software, a power controller 110 including regulators coupled to battery 300 for generating DC voltages for powering other blocks, a line conditioner 113 coupled to external power source 119, a keypad/display microcomputer 114 including internal ROM with control software for controlling display 116 for displaying entered digits of telephone numbers when enabled and keypad 118 having keys activated for entering corresponding digits of telephone numbers. Radio microcomputer 104, keypad/display microcomputer 114, and vehicular adaptor 200 are coupled to and communicate with one another by way of three-wire data bus 115, which operates as described in U.S. Pat. Nos. 4,369,516 and 4,616,314 (incorporated herein by reference). Blocks 102-126 of portable telephone 100 may be conventional blocks of commercially available portable radiotelephones, such as, for example, the "MICROTAC PT" Cellular Telephone available from Motorola, Inc. The "MICROTAC PT" Cellular Telephone is described in further detail in operator's manual no. 68P81150E49, published by and available from Motorola C & E Parts, 1313 East Algonquin Road, Schaumburg, Ill. 60196.

Vehicular adaptor 200 may likewise be conventional adaptors for commercially available portable radiotelephones. In the preferred embodiment, vehicular adaptor 200 may be a battery eliminator adaptor with a cigarette lighter plug, a hands-free adaptor with regulated power supply, or a mobile transceiver adaptor with regulated power supply, all of which couple portable telephone 100 to vehicle battery 500. According to the present invention, the operating mode of portable telephone 100 automatically changes when it is coupled to or decoupled from vehicular adaptor 200 during a cellular telephone call. When coupled to battery 300, portable telephone 100 is in the battery mode, in which inter alia, display 116 is disabled by microcomputer 114 when inactive (no keys of keypad 118 activated) for a predetermined time for minimizing battery current drain. Display 116 is re-enabled when keys of keypad 118 are activated to display the telephone number digit corresponding to the activated key (see the aforementioned operator's manual no. 68P81150E49). When coupled to battery eliminator adaptor 200, portable telephone 100 is in the battery eliminator mode, in which, inter alia, display 116 is not disabled when inactive for a predetermined time. When coupled to duplex hands-free adaptor (DHFA) 200, portable telephone 100 is in the DHFA mode, in which, inter alia, display 116 is not disabled when inactive for a predetermined time. When coupled to mobile transceiver adaptor (CVC) 200, portable telephone 100 is in the CVC mode, in which, inter alia, display 116 is not disabled when inactive for a predetermined time. The foregoing modes of operation of portable telephone 100 are summarized below in Table I.

TABLE I

| Portable Mode | Power Supply | Display Timer | External Data Bus | Amplifiers 122 & 126 |
|---|---|---|---|---|
| Battery | Internal | Enabled | Not used | Enabled |
| Battery Eliminator | External | Disabled | Not used | Enabled |
| Hands-Free | External | Disabled | CMP = Shifted High State | Disabled |
| Mobile Transceiver | External | Disabled | Used | Disabled |

Portable telephone 100 also includes timer 400 which may be implemented by individual components as shown in FIG. 4 or which may be a commercially available real-time clock which has a digital output having a value indicating the current time and is coupled via diode 427 to back-up battery 424 providing power when battery 300 is removed. Timer 400 is necessary to prevent attempting to re-connect a cellular telephone call when more than a predetermined length of time has elapsed during a power source change. In this case, the cellular telephone call should not be re-connected since the cellular base site equipment of the cellular radiotelephone system will terminate the call automatically on loss of the supervisory audio tone (SAT) for a predetermined length of time and may then re-assign the cellular radio channel and SAT to another cellular telephone call. In most cellular radiotelephone systems, the predetermined length of time for loss of SAT is typically greater than five seconds.

When battery 300 is removed during a cellular telephone call in order to replace it with a fully charged battery, timer 400 produces an output signal 414 having a binary zero state (approximately signal ground) for a period of approximately four seconds which is shorter than the base site loss of SAT detection (at least five seconds). If another battery 300 is plugged into portable telephone 100 within the four second period, cellular telephone 100 may detect the binary zero state of timer output signal 414 and re-enter the cellular telephone call that was in process when the discharged battery 300 was removed. If the fully charged battery 300 was not plugged in within the four second period, timer output signal 414 will have a binary one state (approximately 5 VDC) and the previous cellular telephone call will not be re-entered. A cellular telephone call is also re-entered after the momentary power source interruption due to plugging and un-plugging vehicular adaptor 200, and according to the present invention, the operating mode of portable telephone 100 also automatically changes.

Portable telephone 100 also includes a circuit 418, 420 and 422 which supplies standby current to RAM of radio microcomputer 104. Capacitor 418 is kept charged through resistor 420 and diode 422 to approximately +5 V and supplies RAM of radio microcomputer 104 with standby current for at least four seconds when battery 300 or external power source 119 is interrupted. Diode 422 also prevents capacitor 418 from discharging into the +5 V supply when the +5 V supply is off. Resistor 420 limits the charging surge current applied to capacitor 418. Alternatively, back-up battery 424 may be used to supply RAM of radio microcomputer 104 with standby current via diode 427.

In order to re-establish a cellular telephone call after a power source change, certain call parameters need to be stored in RAM of radio microcomputer 104. Such call parameters include, for example and without limitation, the present cellular channel number (corresponding to the transmitter and receiver frequencies of cellular transceiver 102), the present supervisory audio tone (SAT) frequency, the present transmitter power level setting (i.e. one of eight possible levels), a call state active flag to indicate that a call was in process prior to the power source change, and the present user telephone number that was used to place the call (the user may have a cellular telephone with multiple telephone numbers). These call parameters are stored in RAM of radio microcomputer 104.

Figure 2:
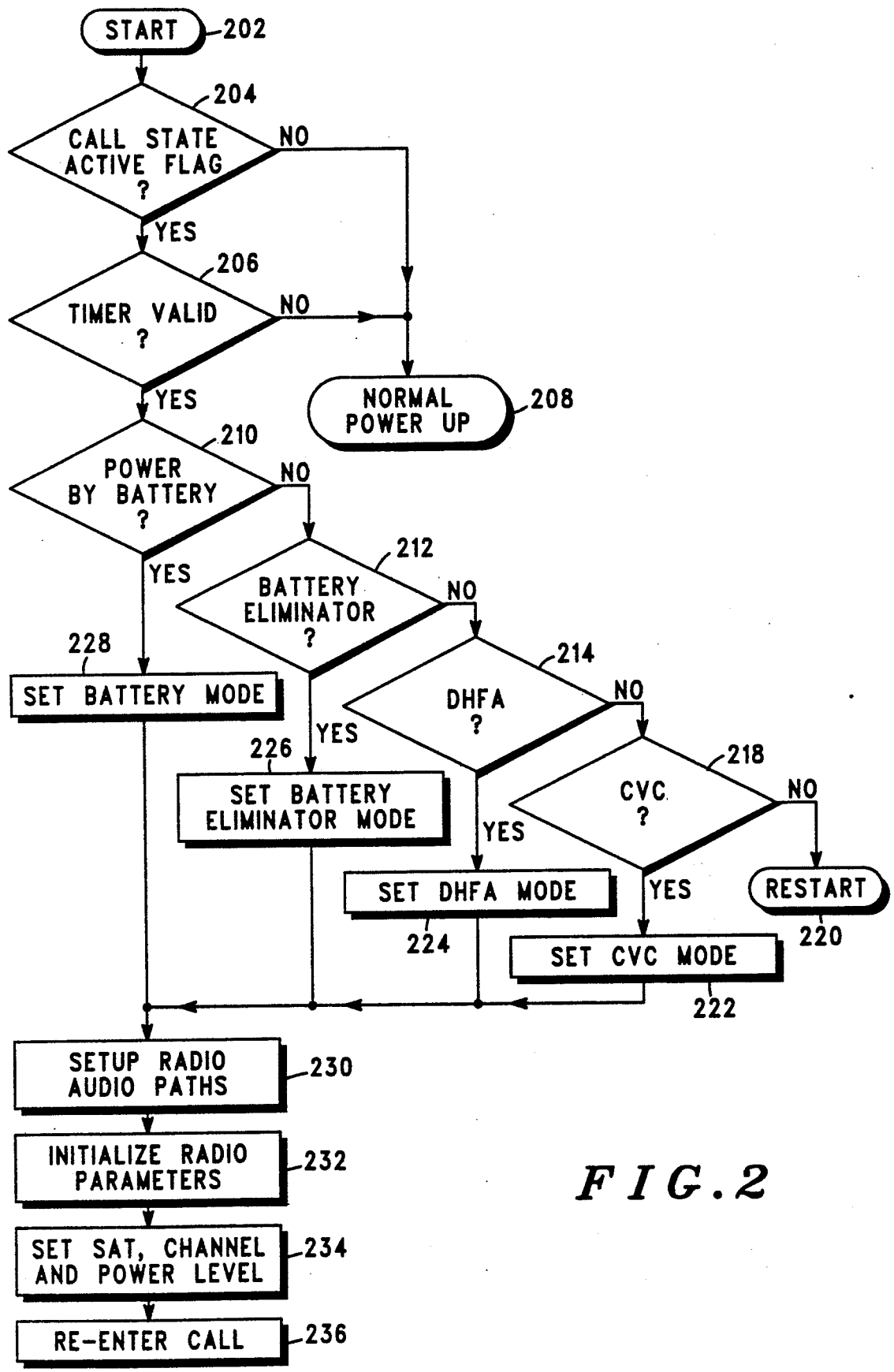
FIG. 2 is a flow chart for the power-up process used by microcomputer 104 in FIG. 1 for re-entering a cellular telephone call in progress before a power source change.

Referring next to FIG. 2, there is illustrated a flow chart for the power-up process used by microcomputer 104 in FIG. 1 for re-entering a cellular telephone call in process before a power source change and determining the new operating mode of portable telephone 100. Entering at START block 202, the process proceeds to decision block 204, where a check of the call state active flag (binary one=call in process) is made to determine if a call had been in process. If not, NO branch is taken to block 208 for executing the normal power up sequence. If a call had been in process, YES branch is taken from decision block 204 to decision block 206, where a check is made to determine if timer output signal 414 has a binary zero state. If not, NO branch is taken to block 208 for executing the normal power up sequence.

If timer output signal 414 has a binary zero state, YES branch is taken from decision block 206 to decision blocks 210, 212, 214 and 218 to determine the new operating mode of portable telephone 100, which may be different from the operating mode prior to the power source change. Portable telephone 100 may be in one of four operating modes, the battery powered mode, the battery eliminator mode, the duplex hands-free (DHFA) mode, or the mobile transceiver (CVC) mode. At decision block 210, a check is made to determine if portable telephone 100 is in the battery powered mode. Microprocessor 104 detects the presence of an external power source by monitoring the external power source signal 119 through line conditioner 116. Line conditioner 116 may be implemented using a bipolar NPN-type transistor having a resistor coupled from its collector to the +5 V supply, and a resistor coupled from its base to signal ground, and a resistor coupled from its base to the external power source signal 119. Line conditioner 116 converts the external power source signal 119 to a binary signal 123 having a binary state indicating whether or not the external power source 119 is present (i.e., binary zero state=external power source 119 present).

When an vehicular adaptor 200 is plugged into portable telephone 100, switch 128 is mechanically engaged and disconnects battery 300 from portable telephone 100. This may be accomplished by means of a protrusion on the connector of vehicular adaptor 200. When mechanically engaged, the protrusion on the connector of vehicular adaptor 200 opens switch 128 which in turn disconnects battery 300. When portable telephone 100 is not plugged into vehicular adaptor 200, switch 128 is normally closed. A diode 117 is connected between line conditioner 116 and battery 300 to prevent battery 300 from enabling line conditioner 116 when external power source 119 is not present.

If portable telephone 100 is in the battery powered mode, YES branch is taken from decision block 210 to block 228, where the battery powered mode flag is set (i.e., set=binary one state). If portable telephone 100 is not in the battery powered mode, NO branch is taken from decision block 210 to decision block 212, where a check is made to determine if portable telephone 100 is in the battery eliminator mode. If so, YES branch is taken to block 226, where the battery eliminator mode flag is set. If portable telephone 100 is not in the battery eliminator mode, NO branch is taken from decision block 212 to decision block 214, where a check is made to determine if portable telephone 100 is in the DHFA mode. If so, YES branch is taken to block 224, where the DHFA mode flag is set. If portable telephone 100 is not in the DHFA mode, NO branch is taken from decision block 214 to decision block 218, where a check is made to determine if portable telephone 100 is in the CVC mode. If so, YES branch is taken to block 222, where the CVC mode flag is set. If portable telephone 100 is not in the CVC mode, NO branch is taken from decision block 218 to block 220, where a restart is initiated.

Figure 5:
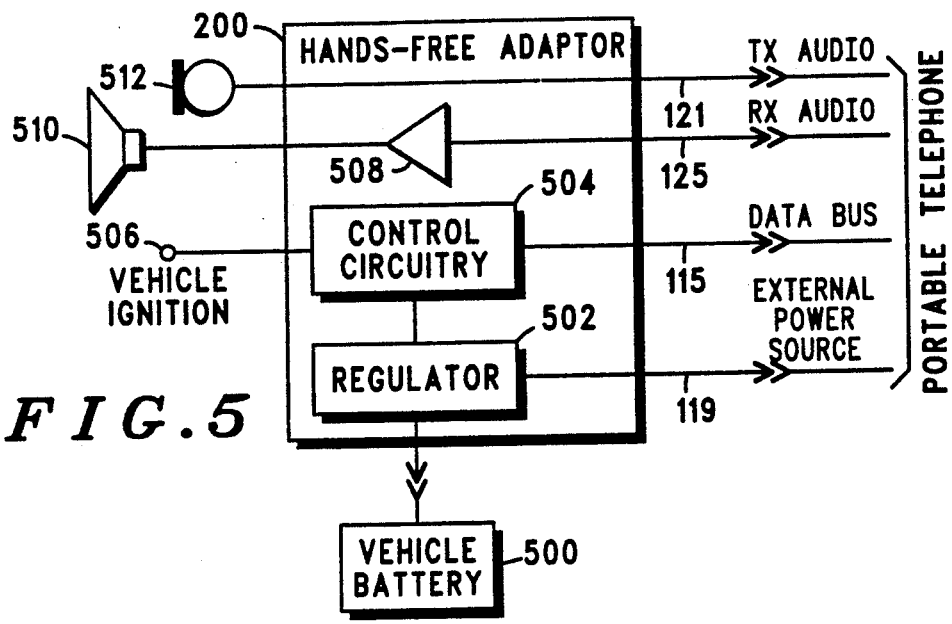
FIG. 5 is a block diagram of a hands-free adaptor embodiment of vehicular adaptor 200 in FIG. 1.
Figure 6:
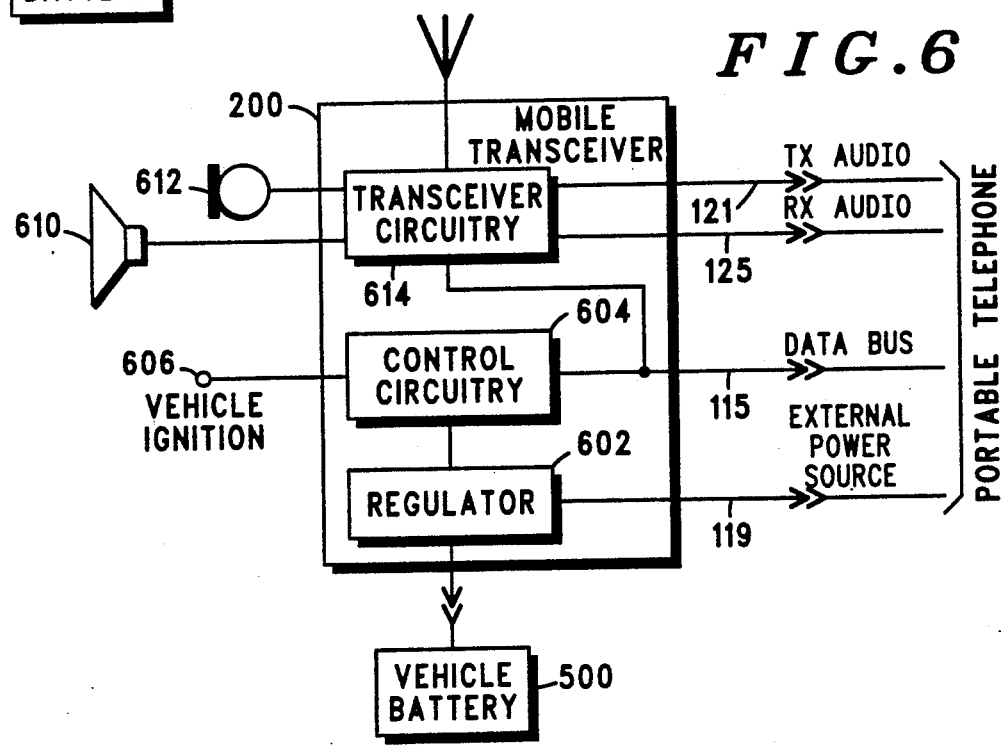
FIG. 6 is a block diagram of a mobile transceiver adaptor embodiment of vehicular adaptor 200 in FIG. 1.

From blocks 222, 224, 226 and 228, the process next proceeds to block 230, where the audio paths for portable telephone 100 are set up. If portable telephone 100 is in the battery powered mode or the battery eliminator (see FIG. 7) mode, audio amplifiers 122 and 126 are enabled and the transmitter (TX) audio 121 and receiver (RX) audio 125 are routed to microphone 120 and speaker 124, respectively. If portable telephone is in the DHFA mode, audio amplifiers 122 and 126 are disabled and the transmitter (TX) audio 121 and receiver (RX) audio 125 are routed to the the hands-free circuitry of vehicular adaptor 200 for processing and coupling to the hands-free microphone 512 and speaker 510, respectively, as shown in FIG. 5. If portable telephone is in the CVC mode, audio amplifiers 122 and 126 are disabled and the mobile transceiver in vehicular adaptor 200 is used, as shown in FIG. 6.

Next, at block 232, the parameters of cellular transceiver 102 are read out of non-volatile memory (RAM) of microcomputer 104 and loaded into cellular transceiver 102. These parameters were previously stored into RAM of microcomputer 104 for identifying the cellular radio channel for the call that was in process. Such parameters include, for example and without limitation, the data which is loaded into the transmitter and receiver synthesizers for tuning cellular transceiver 102 to the desired cellular radio channel. Then, at block 234, the supervisory audio tone (SAT) and the radio transmitter power level are read out of RAM of microcomputer 104 and also loaded into cellular transceiver 102. Once the cellular radio channel, SAT and radio transmitter power level are loaded into cellular transceiver 102, the call that was in process before the power source change can be re-entered at block 236. Thus, by using the flow chart illustrated in FIG. 2, it is possible to not only re-enter a call after a power source change but also automatically change between four different modes of operation of portable telephone 100. In other words, the user can switch from battery operation to operation with another battery, battery eliminator adaptor, hands-free adaptor, or mobile transceiver adaptor automatically during a call as long as the user accomplishes the power source change within the approximately four second time interval of timer 400.

Referring next to FIG. 3, there is illustrated a flow chart for the process used by microcomputer 104 in FIG. 1 for storing and updating specific cellular information during a cellular telephone call. Entering at START block 302 during a cellular telephone call, the process proceeds to block 304, where the cellular radio channel number, SAT, present user telephone number, and radio transmitter power level are stored in RAM of microcomputer 104, and the call state active flag is set and likewise stored. Next, at decision block 306, a check is made to determine if a new cellular radio channel has been assigned to portable telephone 100. A new cellular radio channel is assigned to portable telephone 100 when it is handed off from one base station radio to another. Handoff typically occurs when portable telephone 100 moves from one cell into another. If so, YES branch is taken to block 308, where the new cellular radio channel number is stored in RAM of microcomputer 104. From block 308 and NO branch of decision block 306, the process proceeds to decision block 310, where a check is made to determine if a new SAT has been assigned to portable telephone 100. A new SAT may also be assigned to portable telephone 100 when it is handed off from one base station radio to another. If so, YES branch is taken to block 312, where the new SAT is stored in RAM of microcomputer 104. From block 312 and NO branch of decision block 310, the process proceeds to decision block 314, where a check is made to determine if a new radio transmitter power level has been assigned to portable telephone 100. A new radio transmitter power level is assigned to portable telephone 100 when the base station radio determines that the magnitude of the radio frequency signal received from portable telephone 100 is either lower than a minimum threshold or higher than a maximum threshold and therefore needs to be adjusted. There are currently eight different power levels for cellular telephones, of which portable telephones use six, the two highest power levels not being used due to limitations in the output power of portable telephones. If a new power level has been assigned, YES branch is taken to block 316, where the new power level is stored in RAM of microcomputer 104. From block 316 and NO branch of decision block 314, the process proceeds to decision block 318, where a check is made to determine if the call has been terminated. If not, No branch is taken back to decision block 306 to repeat the foregoing process. If the call has been terminated, YES branch is taken from decision block 318 to block 320, where the call state flag is cleared (i.e. cleared=binary zero), and thereafter a rescan repeating the foregoing process takes place at block 322. The flow chart of FIG. 3 is executed periodically in response to an interrupt which sets the call state flag.

FIG. 4 is a circuit diagram of timer 400 in cellular portable telephone 100 in FIG. 1. Timer 400 includes capacitor 406 which is charged via diode 402 and resistor 404 when the TX PREKEY signal has a binary one state (approximately 4.75 VDC). The TX PREKEY signal has a binary one state whenever the radio transmitter of cellular transceiver 102 is enabled, which is primarily during a cellular telephone call. By only charging capacitor 406 when the TX PREKEY signal has a binary one state, current drain from battery 300 is minimized. If capacitor 406 has been charged to approximately 4.75 VDC during a cellular telephone call and battery 300 is removed or otherwise interrupted, transistor 408 will be turned on via resistors 410 and 412 providing a binary zero state at its output, the timer output signal 414. The binary zero state of timer output signal 414 will be maintained for approximately four seconds based primarily upon the values selected for capacitor 406, resistors 410 and 412 and the beta of transistor 408. If another battery is plugged in or vehicular adaptor 200 is plugged in within the four second period, the binary zero state of the timer output signal 414 may be detected by microcomputer 104 and the cellular telephone call in process before the power source change may be re-entered. If more than four seconds have elapsed, the timer output signal 414 will have a binary one state since capacitor 406 will be discharged to approximately signal ground turning transistor 408 off and producing a binary one state of the timer output signal 414 via resistor 416 to +5 VDC. When timer output signal 414 has a binary one state after a power source change, the previous cellular telephone call will not be re-entered.

Referring to FIG. 5, there is illustrated a block diagram of a hands-free adaptor embodiment of vehicular adaptor 200 in FIG. 1. Portable cellular telephone 100 receives its power via external power source connection 119 which is the output of conventional voltage regulator 502. The voltage supplied by vehicle battery 500 voltage is regulated and controlled by voltage regulator 502. Control circuitry 504 turns regulator output 119 on and off in response to signals from vehicle ignition 506 and data bus 115. Data bus 115 is used by portable telephone 100 to sense if a hands-free adaptor 200 is plugged into portable telephone 100. Receiver audio signal 125 from portable telephone 100 is coupled to amplifier 508 in hands-free adaptor 200 to boost the level to drive speaker 510. The output from microphone 512 is connected to portable cellular phone 100 via TX audio connection 121 of portable telephone 100.

Referring to FIG. 6, there is illustrated a block diagram of a mobile transceiver adaptor embodiment of vehicular adaptor 200 in FIG. 1. Portable telephone 100 receives its power via external power source signal 119 which is the output of conventional voltage regulator 602. The voltage supplied by vehicle battery 500 is regulated and controlled by voltage regulator 602. Control circuitry 604 turns regulator output 119 on and off in response to signals from vehicle ignition 606 and data bus 115. Data bus 115 is used by portable telephone 100 to sense if a mobile transceiver adaptor 200 is plugged into portable telephone 100. In this mode of operation the transceiver circuitry 614 in the mobile transceiver are used instead of cellular transceiver 102 in portable telephone 100, which is turned off. This configuration allows for improved system performance (i.e. higher TX power and better RX sensitivity). Transmit and receive audio for the mobile transceiver 614 can be coupled to either the TX audio signal 121 and RX audio signal 125 of portable telephone 100 or the hands-free microphone 612 and speaker 610 under control of control circuitry 604 and data bus 115.

Mobile transceiver adaptor 200 may be a conventional cellular transceiver, and in the preferred embodiment is the transceiver of the cellular telephone available from Motorola, Inc., and described in Motorola user's manual no. 68P81116E58-B, entitled "DYNA-TAC 6000XL Cellular Mobile Telephone User's Manual", published by and available from Motorola C & E Parts, 1313 East Algonquin Road, Schaumburg, Ill. 60196.

Figure 7:
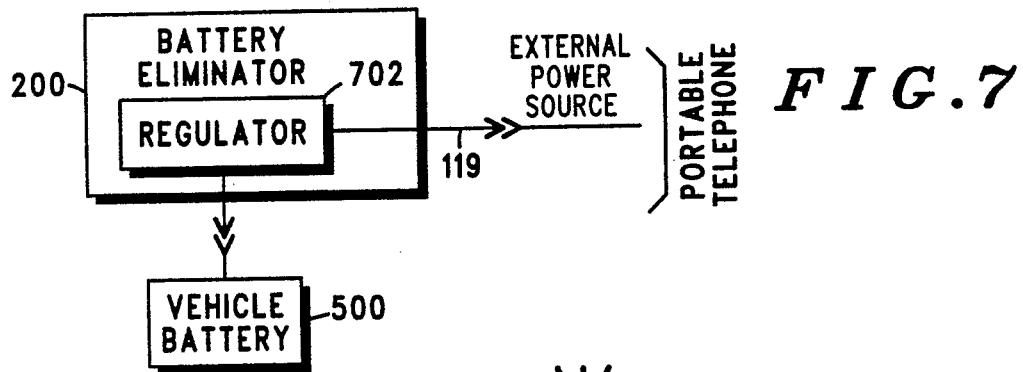
FIG. 7 is a block diagram of a battery eliminator adaptor embodiment of vehicular adaptor 200 in FIG. 1.

Referring to FIG. 7, there is illustrated a block diagram of a battery eliminator adaptor embodiment of vehicular adaptor 200 in FIG. 1. Portable telephone 100 receives its power via external power source connection 119 which is the output of conventional voltage regulator 702. The voltage supplied by vehicle battery 500 is regulated by voltage regulator 702.

In summary, a unique portable radiotelephone, has been described which automatically accommodates a power source change between the portable's battery and another battery or a vehicular adaptor coupled to an external battery during a cellular telephone call. In addition, the portable radiotelephone of the present invention also automatically changes between four different modes of operation in response to a power source change during a cellular telephone call.

We claim:

1. A method for controlling a radiotelephone call when changing the power source coupled to a portable radiotelephone between internal power sources, first external power sources, or the internal power source and the first external power source, said portable radiotelephone having at least first and second modes of operation when coupled to the internal power source and the first external power source, respectively, said method comprising the steps of:

storing, during a radiotelephone call, pre-selected information identifying the radiotelephone call;

producing, in response to an interruption of said power source, an output signal for a predetermined time interval; and re-entering the radiotelephone call corresponding to said stored pre-selected information when said power source is changed and said output signal is present, and operating said portable radiotelephone in the first mode of operation when said power source is changed to the internal power source and in the second mode of operation when said power source is changed to the external power source.

2. The method according to claim 1, wherein said portable radiotelephone includes display means for displaying entered digits of telephone numbers when enabled and keypad means having a plurality of keys activated for entering corresponding digits of telephone numbers, and means for enabling and disabling said display means, said method further including the steps of:

during said first mode, enabling said display means when a key of said keypad means is activated and disabling said display means when the keys of said keypad have not been activated for a predetermined time; and during said second mode, continuously enabling said display means.

3. The method according to claim 1, wherein said portable radiotelephone includes an internal microphone coupled to first amplifying means when enabled and an internal speaker coupled to second amplifying means when enabled, and said portable radiotelephone is further adapted to be coupled to a second external power source provided by first adaptor means including an external microphone and an external speaker, and said portable radiotelephone having a third mode of operation when coupled to the second external power source, said method further including the steps of:

during said first mode, enabling said first and second amplifying means; and during said third mode, disabling said first and second amplifying means.

4. A method for controlling a radiotelephone call when changing the power source coupled to a portable radiotelephone between internal power sources, first external power sources, or the internal power source and the first external power source, said portable radiotelephone having at least first and second modes of operation when coupled to the internal power source and the first external power source, respectively, and said portable radiotelephone including a real time clock producing an output signal having a magnitude indicating current time, said method comprising the steps of:

storing, during a radiotelephone call, pre-selected information identifying the radiotelephone call;

storing the magnitude of the output signal in response to an interruption of said power source; and re-entering the radiotelephone call corresponding to said stored pre-selected information when said power source is changed and the magnitude of the output signal is less than a predetermined amount greater than the stored magnitude of the output signal, and operating said portable radiotelephone in the first mode of operation when said power source is changed to the internal power source and in the second mode of operation when said power source is changed to the external power source.

5. The method according to claim 3, wherein said portable radiotelephone includes display means for displaying entered digits of telephone numbers when enabled and keypad means having a plurality of keys activated for entering corresponding digits of telephone numbers, and means for enabling and disabling said display means, said method further including the steps of:

during said first mode, enabling said display means when a key of said keypad means is activated and disabling said display means when the keys of said keypad have not been activated for a predetermined time; and during said second mode, continuously enabling said display means.

6. The method according to claim 3, wherein said portable radiotelephone includes an internal microphone coupled to first amplifying means when enabled and an internal speaker coupled to second amplifying means when enabled, and said portable radiotelephone is further adapted to be coupled to a second external power source provided by first adaptor means including an external microphone and an external speaker, and said portable radiotelephone having a third mode of operation when coupled to the second external power source, said method further including the steps of:

during said first mode, enabling said first and second amplifying means; and during said third mode, disabling said first and second amplifying means.

7. A portable radiotelephone for communicating radiotelephone calls, said portable radiotelephone having a power source which may be changed between internal power sources, first external power sources, or the internal power source and the first external power source, and said portable radiotelephone having at least first and second modes of operation when coupled to the internal power source and the first external power source, respectively, said portable radiotelephone comprising:

timing means for producing, in response to an interruption of said power source, an output signal for a predetermined time interval; and control means including memory means for storing, during a radiotelephone call, pre-selected information identifying the radiotelephone call, and said control means re-entering the radiotelephone call corresponding to said stored pre-selected information when said power source is changed and said output signal is present, and operating said portable radiotelephone in the first mode of operation when said power source is changed to the internal power source and in the second mode of operation when said power source is changed to the first external power source.

8. The portable radiotelephone according to claim 5, further including display means for displaying entered digits of telephone numbers when enabled, and keypad means having a plurality of keys activated for entering corresponding digits of telephone numbers; said control means enabling said display means when a key of said keypad means is activated, disabling said display means when keys of said keypad means have not been activated for a predetermined time, and operating said portable radiotelephone in the first mode of operation when said power source is changed to the internal power source; and said control means continuously enabling said display means and operating said portable radiotelephone in the second mode of operation when said power source is changed to the first external power source.

9. The portable radiotelephone according to claim 7, further including an internal microphone coupled to first amplifying means when enabled and an internal speaker coupled to second amplifying means when enabled, and said portable radiotelephone further being adapted to be coupled to a second external power source provided by first adaptor means including an external microphone and an external speaker, and said portable radiotelephone having a third mode of operation when coupled to the second external power source, said control means enabling said first and second amplifying means and operating said portable radiotelephone in the first mode of operation when said power source is changed to the internal power source, said control means enabling said first and second amplifying means and operating said portable radiotelephone in the second mode of operation when said power source is changed to the first external power source, and said control means disabling said first and second amplifying means and operating said portable radiotelephone in the third mode of operation when said power source is changed to the second external power source.

10. A portable radiotelephone for communicating radiotelephone calls, said portable radiotelephone having a power source which may be changed between internal power sources, first external power sources, or the internal power source and the first external power source, and said portable radiotelephone having first and second modes of operation for the internal power source and the first external power source, respectively, said portable radiotelephone comprising:

real time clock means coupled to a non-interruptible power source for producing an output signal having a magnitude indicating current time; and control means including memory means for storing, during a radiotelephone call, pre-selected information identifying the radiotelephone call and, in response to an interruption of said power source, the magnitude of the output signal; and said control means re-entering the radiotelephone call corresponding to said stored pre-selected information when said power source is changed and the magnitude of the output signal is less than a predetermined amount greater than the stored magnitude of the output signal, and operating said portable radiotelephone in the first mode of operation when said power source is changed to the internal power source and in the second mode of operation when said power source is changed to the first external power source.

11. The portable radiotelephone according to claim 10, further including display means for displaying entered digits of telephone numbers when enabled, and keypad means having a plurality of keys activated for entering corresponding digits of telephone numbers; said control means enabling said display means when a key of said keypad means is activated, disabling said display means when keys of said keypad means have not been activated for a predetermined time, and operating said portable radiotelephone in the first mode of operation when said power source is changed to the internal power source; and said control means continuously enabling said display means and operating said portable radiotelephone in the second mode of operation when said power source is changed to the first external power source.

12. The portable radiotelephone according to claim 10, further including an internal microphone coupled to first amplifying means when enabled and an internal speaker coupled to second amplifying means when enabled, and said portable radiotelephone further being adapted to be coupled to a second external power source provided by first adaptor means including an external microphone and an external speaker, and said portable radiotelephone having a third mode of operation when coupled to the second external power source, said control means enabling said first and second amplifying means and operating said portable radiotelephone in the first mode of operation when said power source is changed to the internal power source, said control means enabling said first and second amplifying means and operating said portable radiotelephone in the second mode of operation when said power source is changed to the first external power source, and said control means disabling said first and second amplifying means and operating said portable radiotelephone in the third mode of operation when said power source is changed to the second external power source.

* * * * *